United States Patent
Kikuchi (10) Patent No.: US 11,458,625 B2
(45) Date of Patent: Oct. 4, 2022

(54) HORIZONTAL ARTICULATED ROBOT AND ROBOT SYSTEM

(71) Applicant: Seiko Epson Corporation, Tokyo (JP)

(72) Inventor: Takayuki Kikuchi, Chino (JP)

(73) Assignee: SEIKO EPSON CORPORATION

( * ) Notice: Subject to any disclaimer, the term of this patent is extended or adjusted under 35 U.S.C. 154(b) by 252 days.

(21) Appl. No.: 16/832,272

(22) Filed: Mar. 27, 2020

(65) Prior Publication Data

US 2020/0306963 A1    Oct. 1, 2020

(30) Foreign Application Priority Data

Mar. 29, 2019  (JP) .............................. JP2019-068684

(51) Int. Cl.
  *B25J 9/16*   (2006.01)
  *B25J 17/02*  (2006.01)

(52) U.S. Cl.
  CPC ......... *B25J 9/1633* (2013.01); *B25J 17/0241* (2013.01)

(58) Field of Classification Search
  CPC .... B25J 9/1633; B25J 17/0241; B25J 13/085; B25J 9/044; B25J 9/12; B25J 9/1602; B25J 13/088
  USPC .................................................. 700/245–264
  See application file for complete search history.

(56) References Cited

U.S. PATENT DOCUMENTS

| | | | | |
|---|---|---|---|---|
| 4,573,362 A | * | 3/1986 | Amlani | G01L 1/2218 73/862.045 |
| 4,821,584 A | * | 4/1989 | Lembke | G01L 1/16 73/862.68 |
| 4,836,034 A | * | 6/1989 | Izumi | G01L 5/162 73/862.044 |
| 4,873,476 A | * | 10/1989 | Kurakake | G05B 19/237 318/632 |
| 4,894,908 A | * | 1/1990 | Haba, Jr. | B23P 21/004 29/784 |
| 4,951,517 A | * | 8/1990 | Azuma | F16H 13/02 414/744.5 |
| 5,046,915 A | * | 9/1991 | Azuma | F16H 13/02 476/12 |
| 5,144,211 A | * | 9/1992 | Daggett | B25J 9/1633 318/568.11 |
| 5,203,748 A | * | 4/1993 | Sawada | F16H 13/06 475/183 |
| 5,271,292 A | * | 12/1993 | Sawada | B25J 9/044 474/69 |
| 5,425,133 A | * | 6/1995 | Yasuhara | B25J 9/1612 414/744.5 |

(Continued)

FOREIGN PATENT DOCUMENTS

JP    H04-256590 A    9/1992

*Primary Examiner* — Jaime Figueroa
(74) *Attorney, Agent, or Firm* — Harness, Dickey & Pierce, P.L.C.

(57) ABSTRACT

A horizontal articulated robot includes a base, a first arm coupled to the base and configured to turn around a first axis, a second arm coupled to the first arm and configured to turn around a second axis parallel to the first axis, a third arm coupled to the second arm and configured to turn around a third axis parallel to the first axis and move along the third axis, a motor provided in the second arm and configured to drive the third arm, and a force detecting section provided between the motor and the second arm and configured to detect reaction generated by driving the motor.

5 Claims, 6 Drawing Sheets

(56) References Cited

U.S. PATENT DOCUMENTS

| | | | |
|---|---|---|---|
| 5,534,761 A * | 7/1996 | Crippa | B25J 9/106 414/744.5 |
| 5,821,432 A * | 10/1998 | Sidler | G01L 5/167 73/862.041 |
| 5,909,938 A * | 6/1999 | Brenner | F16P 7/00 33/503 |
| 6,212,968 B1 * | 4/2001 | Hiruma | B25J 9/1602 901/23 |
| 6,593,718 B1 * | 7/2003 | Yamazoe | B25J 9/042 318/568.11 |
| 7,347,120 B2 * | 3/2008 | Friedrich | B25J 19/0075 414/744.5 |
| 7,594,445 B2 * | 9/2009 | Hirabayashi | G01L 1/26 73/862.041 |
| 8,240,972 B2 * | 8/2012 | Tokumitsu | B25J 9/104 414/744.5 |
| 8,442,686 B2 * | 5/2013 | Saito | B25J 9/06 700/250 |
| 8,838,275 B2 * | 9/2014 | Motoyoshi | B25J 9/1694 700/250 |
| 9,399,288 B2 * | 7/2016 | Peng | B25J 9/126 |
| 10,071,483 B2 * | 9/2018 | Shimodaira | B25J 17/0208 |
| D847,890 S * | 5/2019 | Liu | D21/578 |
| 10,391,644 B2 * | 8/2019 | Brudniok | B25J 19/063 |
| 10,578,500 B2 * | 3/2020 | Kawai | G01L 1/16 |
| 10,780,535 B2 * | 9/2020 | Huang | B25J 17/0225 |
| 11,192,244 B2 * | 12/2021 | Nakamura | B25J 9/1694 |
| 2008/0282821 A1 * | 11/2008 | Tokumitsu | B25J 18/025 74/25 |
| 2009/0093908 A1 * | 4/2009 | Hashimoto | H01L 21/67766 901/33 |
| 2013/0073086 A1 * | 3/2013 | Motoyoshi | G05B 15/00 700/258 |
| 2014/0174240 A1 * | 6/2014 | Peng | H02K 7/102 74/490.03 |
| 2015/0100160 A1 * | 4/2015 | Arai | B25J 9/1633 73/862.61 |
| 2015/0120052 A1 * | 4/2015 | Mizushima | G01L 1/16 700/258 |
| 2015/0158186 A1 * | 6/2015 | Chuo | B25J 9/044 74/490.03 |
| 2015/0239126 A1 * | 8/2015 | Matsuzawa | G01L 5/167 700/258 |
| 2015/0360369 A1 * | 12/2015 | Ishikawa | B25J 9/1674 901/23 |
| 2016/0354928 A1 * | 12/2016 | Shimodaira | B25J 9/1679 |
| 2018/0012789 A1 * | 1/2018 | Handa | H01L 21/68707 |
| 2018/0021900 A1 * | 1/2018 | Huang | B23P 19/066 700/114 |
| 2018/0129184 A1 * | 5/2018 | Shimodaira | B25J 9/1694 |
| 2018/0215054 A1 * | 8/2018 | Brudniok | B25J 19/02 |
| 2018/0217013 A1 * | 8/2018 | Kawai | B25J 13/085 |
| 2019/0126476 A1 * | 5/2019 | Nakamura | B25J 9/1694 |

* cited by examiner

HORIZONTAL ARTICULATED ROBOT AND ROBOT SYSTEM

The present application is based on, and claims priority from JP Application Serial Number 2019-068684, filed Mar. 29, 2019, the disclosure of which is hereby incorporated by reference herein in its entirety.

BACKGROUND

1. Technical Field

The present disclosure relates to a horizontal articulated robot and a robot system.

2. Related Art

In recent years, in factories, according to a sharp rise in personal expenses and labor shortage, automation of work that has been manually performed has been accelerated by various robots and peripheral apparatuses of the robots. In simple conveying and screwing processes, for example, a horizontal articulated robot, that is, a SCARA robot described in JP A-4-256590 (Patent Literature 1) has been widely used among the various robots.

The SCARA robot described in Patent Literature 1 includes a first arm that rotates around a first axis, a second arm that rotates around a second axis, and a shaft that rotates around a third axis and moves in a third axial direction. Concerning driving of the shaft, operations of the rotation around the third axis and the movement in the third axial direction can be realized using a ball screw spline. A force sensor and an end effector (a hand) are set at the distal end of the shaft. Driving of the robot is controlled based on force detected by the force sensor to perform various kinds of work.

However, in the SCARA robot described in Patent Literature 1, since the force sensor is provided at the distal end of the shaft, the length of an actually operating portion of the shaft, that is, the length from a portion of the second arm supporting the shaft to the end effector is large, leading to an increase in the size of the SCARA robot.

SUMMARY

An advantage of some aspects of the present disclosure is to solve at least apart of the problems described above and the present disclosure can be implemented by the following application example.

A horizontal articulated robot according to an application example includes: a base; a first arm coupled to the base and configured to turn around a first axis; a second arm coupled to the first arm and configured to turn around a second axis parallel to the first axis; a third arm coupled to the second arm and configured to turn around a third axis parallel to the first axis and move along the third axis; a motor provided in the second arm and configured to drive the third arm; and a force detecting section provided between the motor and the second arm and configured to detect reaction generated by driving the motor.

A robot system according to an application example includes: the horizontal articulated robot according to the application example; and a control section configured to control the driving of the third arm based on the reaction detected by the force detecting section.

DESCRIPTION OF EXEMPLARY EMBODIMENTS

A horizontal articulated robot and a robot system according to the present disclosure are explained in detail below based on a preferred embodiment shown in the accompanying drawings.

Embodiment

Figure 1:
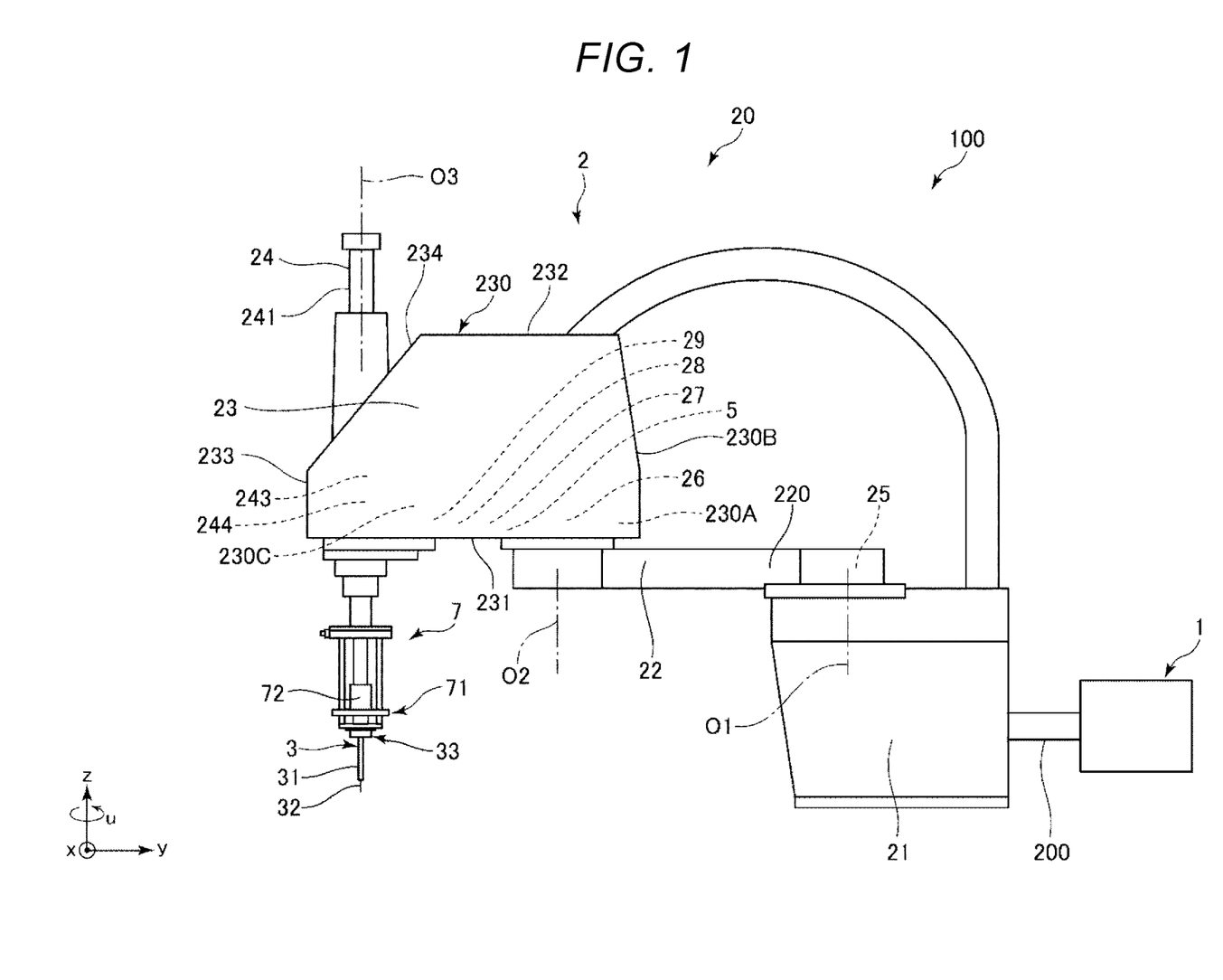
FIG. 1 is a side view showing an embodiment of a horizontal articulated robot and a robot system according to the present disclosure.
Figure 2:
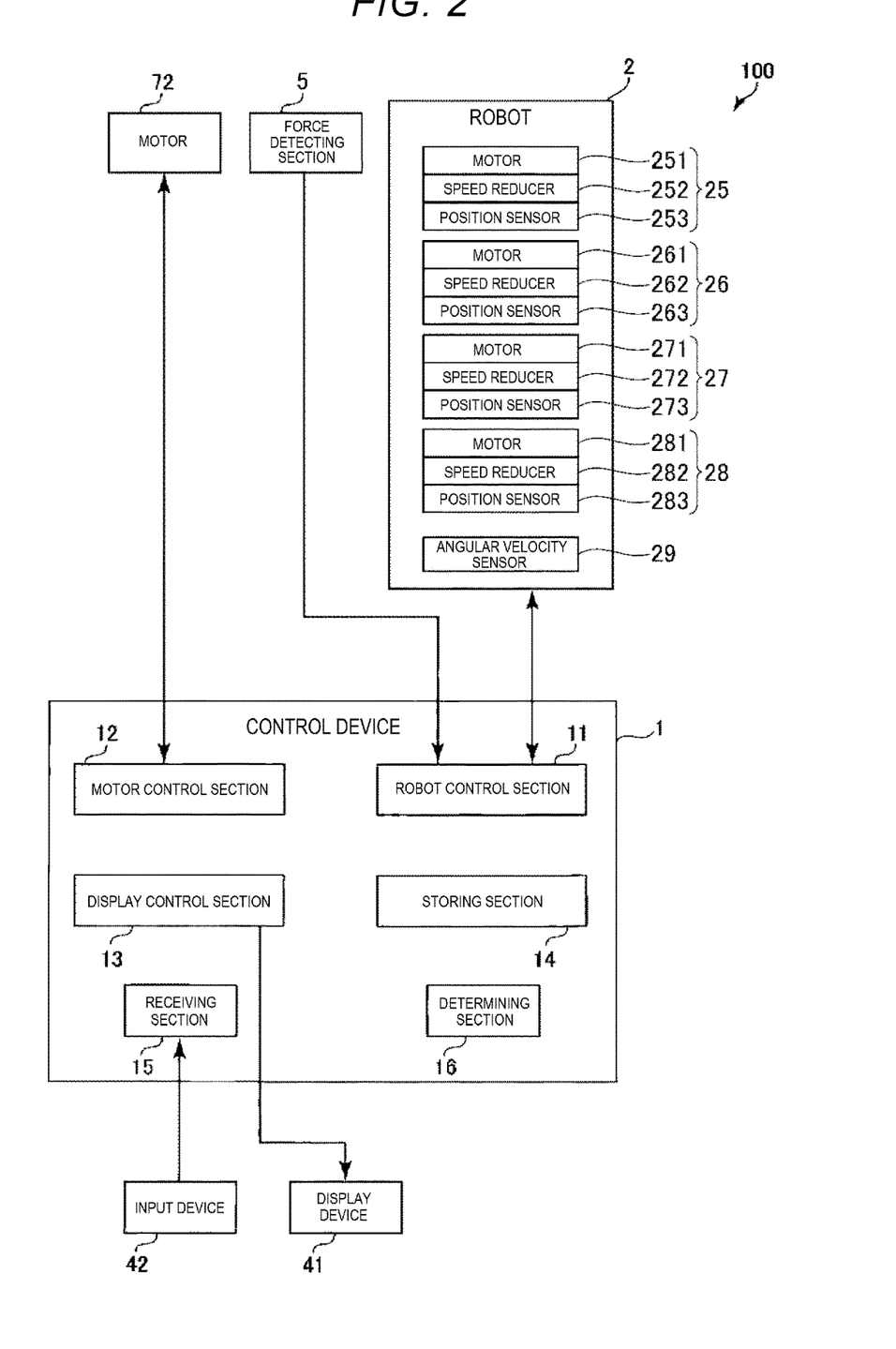
FIG. 2 is a block diagram of the robot system shown in FIG. 1.
Figure 3:
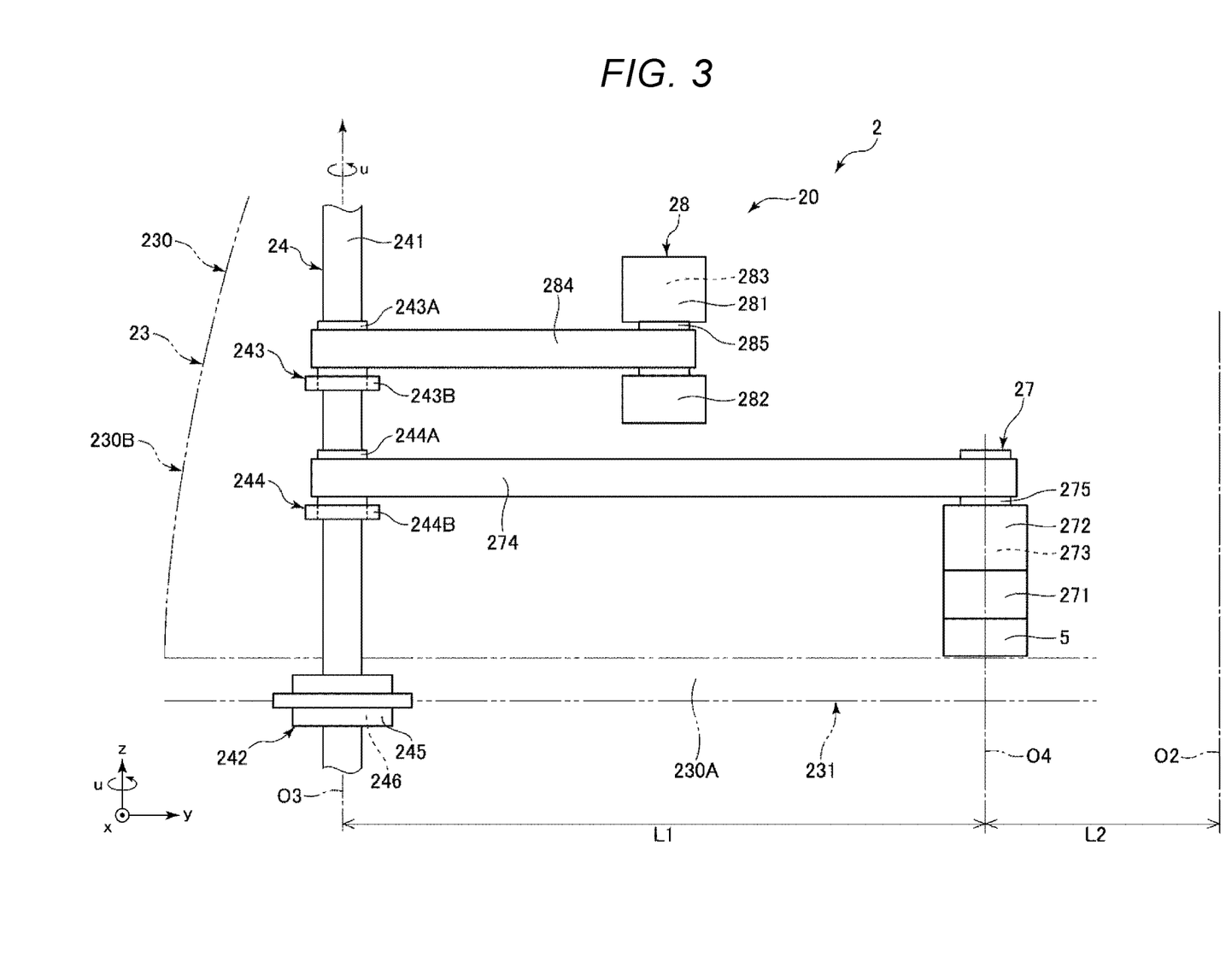
FIG. 3 is a side view showing the inside of a second arm of the horizontal articulated robot shown in FIG. 1.
Figure 4:
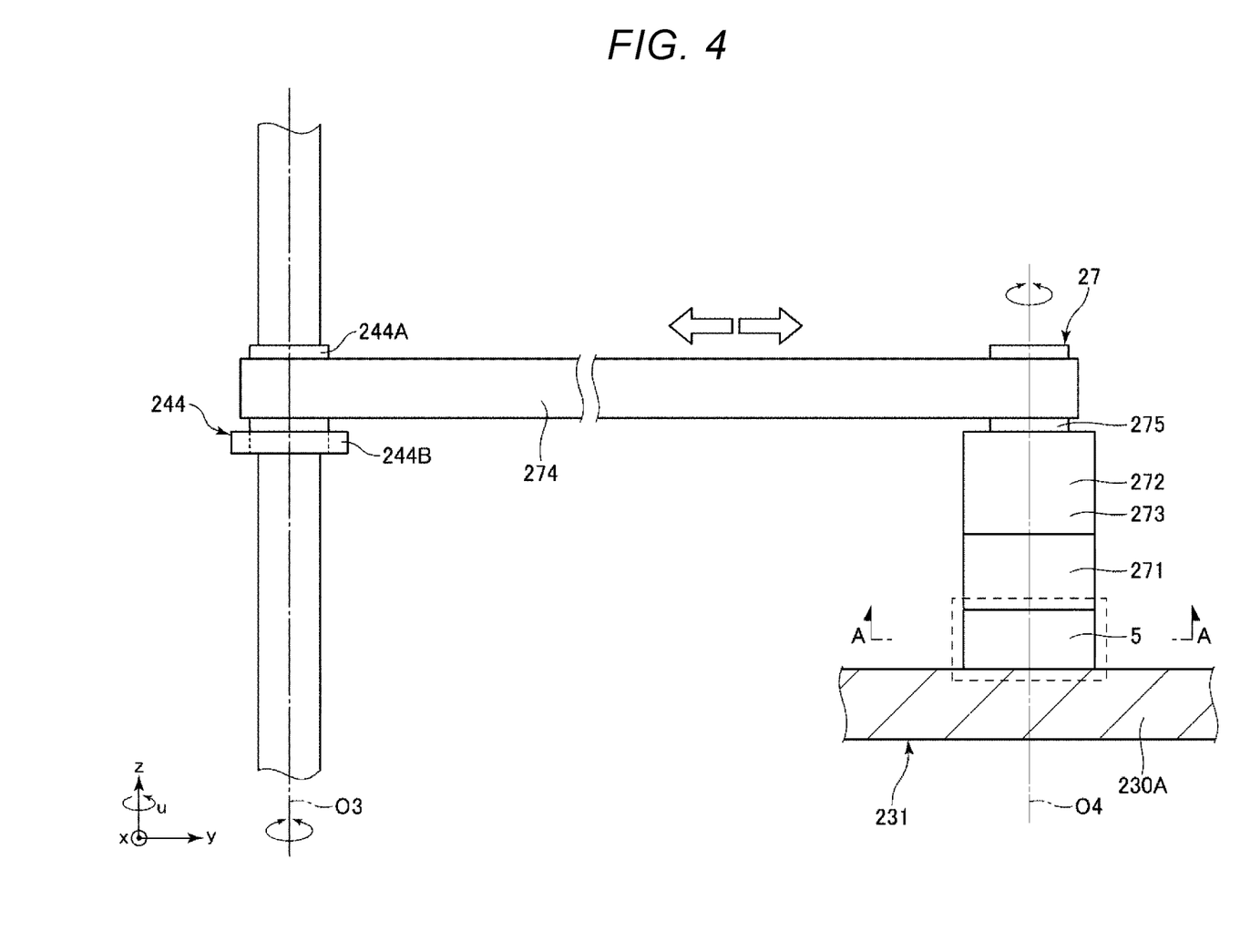
FIG. 4 is a partially enlarged view of the inside of the second arm shown in FIG. 3.
Figure 5:
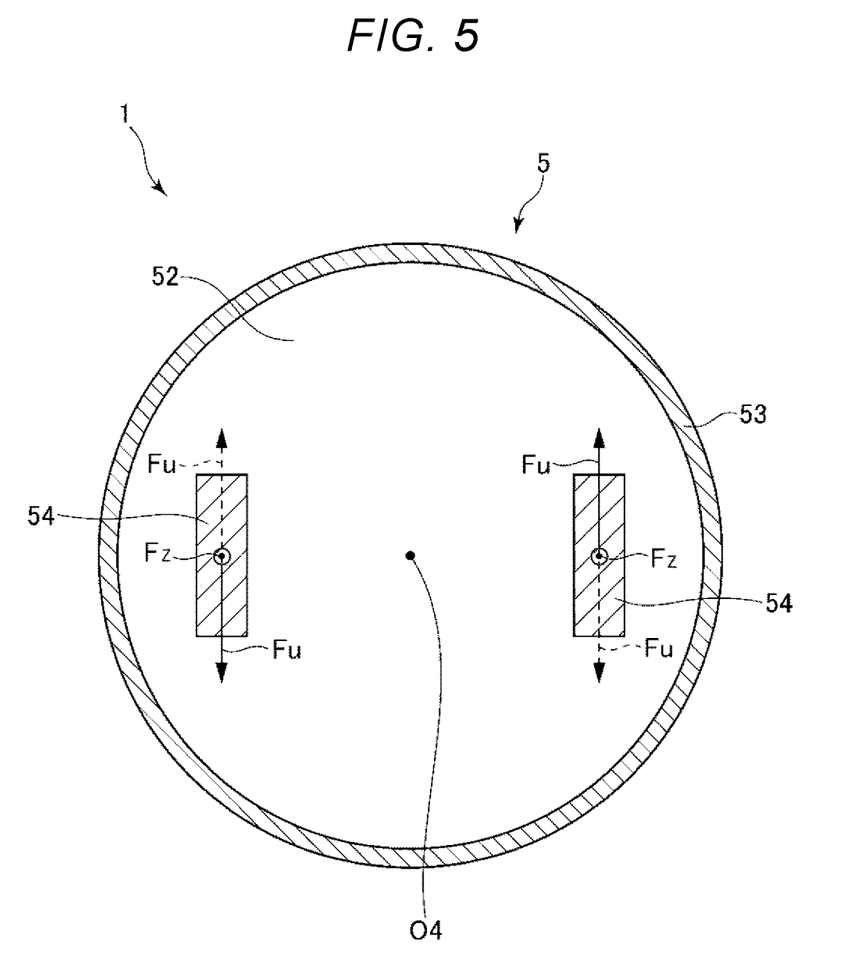
FIG. 5 is an A-A line sectional view in FIG. 4.
Figure 6:
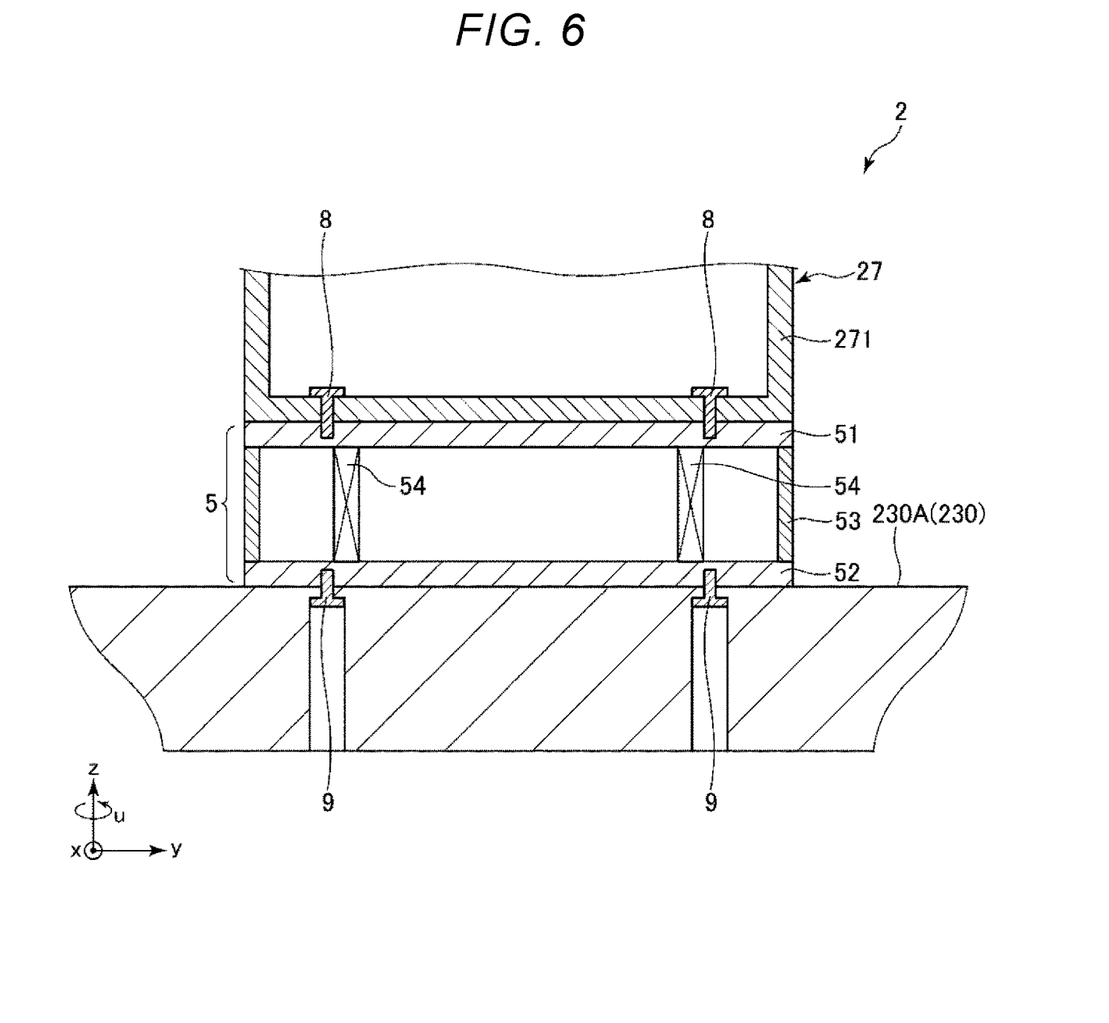
FIG. 6 is an enlarged sectional view of a region indicated by a broken line in FIG. 4.

FIG. 1 is a side view showing an embodiment of the horizontal articulated robot and the robot system according to the present disclosure. FIG. 2 is a block diagram of the robot system shown in FIG. 1. FIG. 3 is a side view showing the inside of a second arm of the horizontal articulated robot shown in FIG. 1. FIG. 4 is a partially enlarged view of the inside of the second arm shown in FIG. 3. FIG. 5 is an A-A line sectional view in FIG. 4. FIG. 6 is an enlarged sectional view of a region indicated by a broken line in FIG. 4.

In FIGS. 1, 3, and 4, for convenience of explanation, an x axis, a y axis, and a z axis are shown as three axes orthogonal to one another. In the following explanation, a direction parallel to the x axis is referred to as "x-axis direction" as well, a direction parallel to the y axis is referred to as "y-axis direction" as well, and a direction parallel to the z axis is referred to as "z-axis direction" as well. Further, in the following explanation, a distal end side of arrows shown in the figures is referred to as "+ (plus)" and a proximal end side of the arrows is referred to as "− (minus)". A direction parallel to a +x-axis direction is referred to as "+x-axis direction" as well. A direction parallel to a −x-axis direction is referred to as "−x-axis direction" as well. A direction parallel to a +y-axis direction is referred to as "+y-axis direction" as well. A direction parallel to a −y-axis direction is referred to as "−y-axis direction" as well. A direction parallel to a +z-axis direction is referred to as "+z-axis direction" as well. A direction parallel to a −z-axis direction is referred to as "−z-axis direction" as well. A direction around the z axis and a direction around an axis parallel to the z axis are referred to as "u-axis direction" as well.

Further, in the following explanation, for convenience of explanation, the +z-axis direction, that is, the upper side in FIG. 1 is referred to as "upper" as well and the −z-axis direction, that is, the lower side in FIG. 1 is referred to as "lower" as well. About a robot arm 20, a base 21 side in FIG. 1 is referred to as "proximal end" and the opposite side of the base 21 side, that is, an end effector 7 side is referred to as "distal end". The z-axis direction, that is, the up-down direction in FIG. 1 is represented as "vertical direction". The x-axis direction and the y-axis direction, that is, the left-right direction is represented as "horizontal direction".

A robot system 100 shown in FIGS. 1 and 2 is, for example, an apparatus used in work such as holding, conveyance, assembly, and inspection of work (objects) such as electronic components and electronic devices. The robot system 100 includes a control device 1, a robot 2, the end effector 7, a display device 41, and an input device 42.

In a configuration shown in FIGS. 1 and 2, the control device 1 is disposed on the outer side of the robot 2. However, not only this, but the control device 1 may be incorporated in the robot 2.

In the configuration shown in FIGS. 1 and 2, the robot and the control device 1 are electrically coupled (hereinafter simply referred to as "coupled" as well) by a cable 200. However, not only this, but, the cable 200 may be omitted and the robot 2 and the control device 1 may perform communication in a wireless scheme. In other words, the robot 2 and the control device 1 may be coupled by wired communication or may be coupled by wireless communication.

The robot 2 is a horizontal articulated robot, that is, a SCARA robot.

As shown in FIG. 1, the robot 2 includes the base 21, a first arm 22, a second arm 23, a third arm 24, which is a work head, and a force detecting section 5. The robot arm 20 is configured by the first arm 22, the second arm 23, the third arm 24, and the like.

The robot 2 includes a driving unit 25 configured to rotate the first arm 22 with respect to the base 21, a driving unit 26 configured to rotate the second arm 23 with respect to the first arm 22, a u-driving unit 27 configured to rotate a shaft 241 of the third arm 24 with respect to the second arm 23, a z-driving unit 28 configured to move the shaft 241 in the z-axis direction with respect to the second arm 23, and an angular velocity sensor 29.

As shown in FIGS. 1 and 2, the driving unit 25 is incorporated in a housing 220 of the first arm 22. The driving unit 25 includes a motor 251 configured to generate a driving force, a speed reducer 252 configured to reduce the driving force of the motor 251, and a position sensor 253 configured to detect a rotation angle of a rotation axis of the motor 251 or the speed reducer 252.

The driving unit 26 is incorporated in a housing 230 of the second arm 23. The driving unit 26 includes a motor 261 configured to generate a driving force, a speed reducer 262 configured to reduce the driving force of the motor 261, and a position sensor 263 configured to detect a rotation angle of a rotation axis of the motor 261 or the speed reducer 262.

The u-driving unit 27 is incorporated in the housing 230 of the second arm 23. The u-driving unit 27 includes a motor 271 configured to generate a driving force, a speed reducer 272 configured to reduce the driving force of the motor 271, and a position sensor 273 configured to detect a rotation angle of a rotation axis of the motor 271 or the speed reducer 272.

The z-driving unit 28 is incorporated in the housing 230 of the second arm 23. The z-driving unit 28 includes a motor 281 configured to generate a driving force, a speed reducer 282 configured to reduce the driving force of the motor 281, and a position sensor 283 configured to detect a rotation angle of a rotation axis of the motor 281 or the speed reducer 282.

As the motor 251, the motor 261, the motor 271, and the motor 281, for example, a servomotor such as an AC servomotor or a DC servomotor can be used.

As the speed reducer 252, the speed reducer 262, the speed reducer 272, and the speed reducer 282, for example, a speed reducer of a planetary gear type or a wave motion gear device can be used. The position sensor 253, the position sensor 263, the position sensor 273, and the position sensor 283 can be, for example, angle sensors.

The driving unit 25, the driving unit 26, the u-driving unit 27, and the z-driving unit 28 are respectively coupled to not-shown motor drivers corresponding thereto and are controlled by a robot control section 11 of the control device 1 via the motor drivers. The speed reducers may be omitted.

The angular velocity sensor 29 is incorporated in the second arm 23. Accordingly, the angular velocity sensor 29 can detect angular velocity of the second arm 23. The control device 1 controls the robot 2 based on information concerning the detected angular velocity. The angular velocity sensor 29 is set further on the −y-axis side, that is, a far side of the base 21 than the driving units 26 to 28.

The base 21 is fixed to, for example, a not-shown floor surface by bolts or the like. The first arm 22 is coupled to the upper end portion of the base 21. The first arm 22 is rotatable, with respect to the base 21, around a first axis O1 extending along the vertical direction. When the driving unit 25, which rotates the first arm 22, is driven, the first arm 22 rotates within a horizontal plane around the first axis O1 with respect to the base 21. A rotation amount of the first arm 22 with respect to the base 21 can be detected by the position sensor 253.

The second arm 23 is coupled to the distal end portion of the first arm 22. The second arm 23 is rotatable, with respect to the first arm 22, around a second axis O2 extending along the vertical direction. The axial direction of the first axis O1 and the axial direction of the second axis O2 are the same. In other words, the second axis O2 is parallel to the first axis O1. When the driving unit 26, which rotates the second arm 23, is driven, the second arm 23 rotates within a horizontal plane around the second axis O2 with respect to the first arm 22. Driving, specifically, a rotation amount of the second arm 23 with respect to the first arm 22 can be detected by the position sensor 263.

The second arm 23 includes the housing 230 including a bottom plate 231, a top plate 232, and a sidewall 233 that couples the bottom plate 231 and the top plate 232. The driving unit 26, the u-driving unit 27, the z-driving unit 28, and the angular velocity sensor 29 are disposed in this order from the +y-axis side on the inside of the housing 230, that is, on the bottom plate 231.

The housing 230 includes an inclined section 234 located between the top plate 232 and the sidewall 233. The inclined section 234 is provided on the −y-axis side of the top plate 232. The inclined section 234 is provided to be inclined with respect to the z-axis.

As shown in FIGS. 3 and 4, the third arm 24 is set at the distal end portion of the second arm 23. The third arm 24 includes the shaft 241 and a rotation supporting member 242 configured to rotatably support the shaft 241.

The shaft 241 is rotatable, with respect to the second arm 23, around a third axis O3 extending along the vertical direction and movable (elevatable) in the up-down direction. The shaft 241 is a third arm of the robot arm 20 and is an arm at the most distal end of the robot arm 20.

A ball screw nut 243 and a spline nut 244 are set halfway in the longitudinal direction of the shaft 241. The shaft 241 is supported by the ball screw nut 243 and the spline nut 244. The ball screw nut 243 and the spline nut 244 are disposed to be separated from the +z-axis side in this order.

The ball screw nut 243 includes an inner ring 243A and an outer ring 243B concentrically disposed on the outer circumference side of the inner ring 243A. A not-shown plurality of balls are disposed between the inner ring 243A and the outer ring 243B. The inner ring 243A and the outer ring 243B rotate relatively to each other according to movement of the balls.

The inner ring 243A includes a portion exposed from the outer ring 243B. A belt 284 explained below is wound around the exposed portion. The shaft 241 is inserted through the inside of the inner ring 243A. As explained below, the inner ring 243A supports the shaft 241 movably along the z-axis direction.

The spline nut 244 includes an inner ring 244A and an outer ring 244B concentrically disposed on the outer circumference side of the inner ring 244A. A not-shown plurality of balls are disposed between the inner ring 244A and the outer ring 244B. The inner ring 244A and the outer ring 244B rotate relatively to each other according to movement of the balls.

The inner ring 244A includes a portion exposed from the outer ring 244B. A belt 274 explained below is wound around the exposed portion. The shaft 241 is inserted through the inside of the inner ring 244A. The inner ring 244A supports the shaft 241 rotatably around the z axis, that is, in the u-axis direction.

The rotation supporting member 242 is set on the −z-axis side of the spline nut 244. The rotation supporting member 242 includes an outer cylinder 245 and a rotating body 246 provided on the inner side of the outer cylinder 245. The outer cylinder 245 is fixed to the bottom plate 231 in the housing 230 of the second arm 23. On the other hand, the rotating body 246 is fixed to the shaft 241 but is supported by the outer cylinder 245 rotatably around the z axis together with the shaft 241.

When the u-driving unit 27, which rotates the shaft 241, is driven, the shaft 241 normally and reversely rotates, that is, rotates around the z axis. A rotation amount of the shaft 241 with respect to the second arm 23 can be detected by the position sensor 273.

When the z-driving unit 28, which moves the shaft 241 in the z-axis direction, is driven, the shaft 241 moves in the up-down direction, that is, the z-axis direction. A movement amount in the z-axis direction of the shaft 241 with respect to the second arm 23 can be detected by the position sensor 283.

Various end effectors are detachably coupled to the distal end portion of the shaft 241. The end effectors are not particularly limited. Examples of the end effectors include an end effector that grips a conveyed object, an end effector that machines work, and an end effector used for inspection. In this embodiment, the end effector 7 is detachably coupled to the distal end portion of the shaft 241. The end effector 7 is explained in detail below.

In this embodiment, the end effector 7 is not a component of the robot 2. However, a part of or the entire end effector 7 may be a component of the robot 2. In this embodiment, the end effector 7 is not a component of the robot arm 20. However, a part of or the entire end effector 7 may be a component of the robot arm 20.

As shown in FIG. 1, the end effector 7 includes an attachment section 71 attached to the shaft 241, a motor 72 provided in the attachment section 71, and a limit gauge for screw 3 detachably concentrically attached to a rotation axis of the motor 72. The end effector 7 is detachably coupled to the distal end portion of the shaft 241. The center axis of the shaft 241, that is, the third axis O3 coincides with a rotation axis of the motor 72, and the center axis of the limit gauge for screw 3. In other words, when viewed from the axial direction of the third axis O3, the third axis O3, the motor 72, and the limit gauge for screw 3 overlap.

The limit gauge for screw 3 is an example of a screw gauge. The limit gauge for screw 3 includes a columnar gripping section 31, a go-side gauge 32 that is provided at one end portion of the gripping section 31 and on which a male screw is formed and a stop-side gauge 33 that is provided on the other end portion of the gripping section 31 and on which a male screw is formed. In the limit gauge for screw 3, when the go-side gauge 32 is used, the end portion of the gripping section 31 where the stop-side gauge 33 is provided is attached to the rotation axis of the motor 72 and the go-side gauge 32 is disposed on the distal end side of the limit gauge for screw 3. When the stop-side gauge 33 is used, the end portion of the gripping section 31 where the go-side gauge 32 is provided is attached to the rotation axis of the motor 72 and the stop-side gauge 33 is disposed on the distal end side of the limit gauge for screw 3.

The motor 72 is not particularly limited. For example, a servomotor such as an AC servomotor or a DC servomotor or a stepping motor is used as the motor 72.

The end effector 7 includes a not-shown angle sensor configured to detect a rotation angle of the rotation axis of the motor 72. The rotation angle of the rotation axis of the motor 72 can be detected by the angle sensor.

In the end effector 7, deterioration in rotation accuracy due to backlash can be suppressed compared with when a power transmission mechanism such as a gear or a belt is interposed between the rotation axis of the motor 72 and the limit gauge for screw 3.

The limit gauge for screw 3 is not limited to such a configuration. The limit gauge for screw 3 may be configured to interchange and use a limit gauge for screw including only a go-side gauge and a limit gauge for screw including only a stop-side gauge.

In this embodiment, the end effector 7 is detachably attachable to the robot arm 20. However, not only this, but, for example, the end effector 7 may be undetachable from the robot arm 20.

The force detecting section 5 detects reaction generated by driving the motor 271. A result of the detection is transmitted to the control device 1.

As explained below, the force detecting section 5 is provided between the second arm 23, that is, a base section 230A and the motor 271. Consequently, reaction generated by driving the motor 271 is transmitted to the force detecting section 5. Accordingly, the reaction can be detected.

As shown in FIG. 2, the control device 1 includes the robot control section 11, a motor control section 12 (an end-effector control section), a display control section 13, a storing section 14, a receiving section 15, and a determining section 16. The control device 1 respectively controls driving of the sections of the robot system 100 such as the robot 2, the motor 72 of the end effector 7, and the display device 41.

The control device 1 is configured to be communicable respectively among the robot control section 11, the motor control section 12, the display control section 13, the storing section 14, the receiving section 15, and the determining section 16. In other words, the robot control section 11, the motor control section 12, the display control section 13, the storing section 14, the receiving section 15, and the determining section 16 are coupled to one another by wired or wireless communication.

The robot 2, the display device 41, the input device 42, and the end effector 7 are respectively coupled to the control device 1 by wired or wireless communication.

The robot control section 11 controls driving of the robot 2, that is, driving of the robot arm 20 and the like. The robot control section 11 is a computer in which programs such as an OS are installed. The robot control section 11 includes, for example, a CPU functioning as a processor, a RAM, and a ROM in which programs are stored. The function of the robot control section 11 can be realized by, for example, executing various programs with the CPU.

The robot control section 11 is electrically coupled to the force detecting section 5. The robot control section 11 regards an electric signal received from the force detecting section 5 as an external force applied to the third arm 24 and converts the electric signal into force. In other words, the robot control section 11 converts a change amount of reaction generated by driving the motor 271 and detected by the force detecting section 5 into an external force applied to the third arm 24. Based on the calculated external force, the robot control section 11 controls a command value to the motor 271 of the u-driving unit 27 that drives the third arm 24 in the u-axis direction and controls a command value to the motor 281 of the z-driving unit 28 that drives the third arm 24 in the z-axis direction. Consequently, the third arm 24 can be moved in the u-axis direction and the z-axis direction according to an applied external force. Accordingly, for example, screwing work can be performed by force control. When an external force exceeding a threshold is applied to the third arm 24, the end effector 7 can be retracted in the +z-axis direction. Even if an external force is not applied, the robot control section can be used for control respectively during first acceleration, during steady operation, during deceleration when the motor 271 is rotated.

In this way, in the robot system 100, the force in the direction of the third axis O3 applied to the third arm 24 is controlled based on the reaction detected by the force detecting section 5.

The motor control section 12 controls driving of the motor 72. The motor control section 12 is a computer in which programs such as an OS are installed. The motor control section 12 includes, for example, a CPU functioning as a processor, a RAM, and a ROM in which programs are stored. The function of the motor control section 12 can be realized by, for example, executing various programs with the CPU.

The display control section 13 has a function of causing the display device 41 to display various screens such as a window, characters, and the like. In other words, the display control section 13 controls driving of the display device 41. The function of the display control section 13 can be realized by, for example, a GPU.

The storing section 14 has a function of storing various kinds of information (including data and programs). The storing section 14 stores a control program and the like. The function of the storing section 14 can be realized by a so-called external storage device (not shown in FIG. 2) such as a ROM.

The receiving section 15 has a function of receiving an input from the input device 42. The function of the receiving section 15 can be realized by, for example, an interface circuit. For example, when a touch panel is used, the receiving section 15 has a function of an input detecting section that detects, for example, contact of a finger of a user with the touch panel.

The display device 41 includes a not-shown monitor configured by, for example, a liquid crystal display or an EL display. The display device 41 has a function of displaying various images including various screens such as a window, characters, and the like.

The input device 42 is configured by, for example, a mouse and a keyboard. Therefore, the user can give instructions for various kinds of processing and the like to the control device 1 by operating the input device 42.

Specifically, the user can give instructions to the control device 1 with operation for clicking, with the mouse of the input device 42, various screens such as a window displayed on the display device 41 and operation for inputting characters, numbers, and the like with the keyboard of the input devoice 42.

In this embodiment, a display input device including both of the display device 41 and the input device 42 may be provided instead of the display device 41 and the input device 42. As the display input device, a touch panel such as an electrostatic touch panel or a pressure-sensitive touch panel can be used. The input device 42 may be configured to recognize sound such as voice.

The inside of the second arm 23 is explained.

In the robot 2, as shown in FIG. 3, the u-driving unit 27 that rotates the third arm 24 around the z axis, the z-driving unit 28 that moves the third arm 24 in the z-axis direction, the belt 274, and the belt 284 are provided in the housing 230 of the second arm 23.

The housing 230 of the second arm 23 includes the base section 230A and a cover member 230B configured to cover the +z-axis side of the base section 230A. The base section 230A is a rigid body and is made of, for example, a metal material or any one of various hard resin materials. Since the base section 230A configures the second arm 23, in the following explanation, the second arm 23 is referred to as base section 230A as well.

As shown in FIG. 3, the u-driving unit 27 includes a pulley 275 in addition to the motor 271, the speed reducer 272, and the position sensor 273. The pulley 275, the speed reducer 272, and the motor 271 are disposed from the +z-axis side in this order and fixed to the base section 230A. The pulley 275 is fixed to a core of the speed reducer 272. A rotation force of the motor 271 is reduced by the speed reducer 272 and transmitted to the pulley 275.

The pulley 275 is coupled to, by the belt 274, the inner ring 244A of the spline nut 244 provided in the shaft 241. The belt 274 is an endless belt wound around the pulley 275 and the inner ring 244A. The belt 274 includes not-shown teeth on the inner side of the belt 274, that is, the pulley 275 and inner ring 244A side. The teeth of the belt 274 are respectively meshed with not-shown teeth of the pulley 275 and the exposed portion of the inner ring 244A.

In such a u-driving unit 27, the rotation force of the motor 271 is transmitted to the belt 274 via the speed reducer 272 and the pulley 275 and the belt 274 rotates. According to the rotation of the belt 274, the rotation force is transmitted to the shaft 241 via the spline nut 244. The rotation force is transmitted to the shaft 241 via the inner circumferential portion of the inner ring 244A and a spline groove of the shaft 241. The shaft 241 can move in the u-axis direction, that is, rotate.

In this way, the third arm 24 includes the shaft 241 and the spline nut 244 provided in the shaft 241. The robot 2 further includes the belt 274 configured to couple the motor 271 and the spline nut 244. Consequently, an external force applied to the shaft 241 is transmitted to the force detecting section 5 via the belt 274, the spline nut 244, and the motor 271. Accordingly, the force detecting section 5 can detect the external force applied to the shaft 241.

As shown in FIG. 3, the z-driving unit 28 includes a pulley 285 in addition to the motor 281, the speed reducer 282, and the position sensor 283. The motor 281, the pulley 285, and the speed reducer 282 are disposed from the +z-axis side in this order. The pulley 285 is fixed to a core of the speed reducer 282. A rotation force of the motor 281 is reduced by the speed reducer 282 and transmitted to the pulley 285. The speed reducer 282 is fixed to the base section 230A via a not-shown spacer.

The pulley 285 is coupled to, by the belt 284, the exposed portion of the inner ring 243A of the ball screw nut 243 provided in the shaft 241. The belt 284 is an endless belt wound around the pulley 285 and the inner ring 243A. The belt 284 includes not-shown teeth on the inner side of the belt 284, that is, the pulley 285 and inner ring 243A side. The teeth of the belt 284 are respectively meshed with not-shown teeth of the pulley 285 and the inner ring 243A.

In such a z-driving unit 28, the rotation force of the motor 281 is transmitted to the belt 284 via the speed reducer 282 and the pulley 285 and the belt 284 rotates. According to the rotation of the belt 284, the rotation force is transmitted to the shaft 241 via the inner ring 243A of the ball screw nut 243. The direction of the rotation force is changed by the inner circumferential portion of the inner ring 243A and a ball screw groove of the shaft 241. The shaft 241 can move in the z-axis direction, that is, move up and down.

The force detecting section 5 is explained.

As shown in FIGS. 3 and 4, the force detecting section 5 is a sensor that detects the force applied to the third arm 24 as explained above. In this embodiment, the force detecting section 5 is provided between the ball screw nut 243 and the base section 230A and fixed to and held by the ball screw nut 243 and the base section 230A. As shown in FIG. 6, the force detecting section 5 includes a first plate 51, a second plate 52, a tubular section 53 disposed between the first plate 51 and the second plate 52, and a plurality of, in this embodiment, two elements 54. The two elements 54 are held between the first plate 51 and the second plate 52.

In this way, the force detecting section 5 includes the first plate 51, the second plate 52, and the plurality of, in this embodiment, two elements 54 held by the first plate 51 and the second plate 52. Consequently, as explained below, the elements 54 can detect reaction generated by the rotation of the motor 271.

The first plate 51 is formed in a disk shape. The surface on the +z-axis side of the first plate 51 is fixed to a housing of the motor 271. In a configuration shown in FIG. 6, the first plate 51 and the motor 271 are fixed via fixing members 8 such as screws or machine screws. The second plate 52 is formed in a disk shape. The surface on the −z-axis side of the second plate 52 is fixed to the surface on the +z-axis side of the base section 230A. In the configuration shown in FIG. 6, the second plate 52 and the base section 230A are fixed via fixing members 9 such as screws or machine screws.

In this embodiment, the tubular section 53 is formed in a cylindrical shape and has a function of protecting the elements 54.

As shown in FIG. 5, the elements 54 are disposed to be opposed to each other via an output axis O4 of the motor 271. In other words, when viewed from the axial direction of the third axis O3, the output axis O4 of the motor 271 is present between the plurality of elements 54. Consequently, forces applied to the elements 54 become uniform as much as possible. The forces can be accurately detected.

The number of the elements 54 is not limited to two shown in FIG. 5 and may be, for example, three or more. However, the number of the elements 54 is desirably four. In this case, the elements 54 are provided at equal intervals along the circumferential direction of the output axis O4. In other words, the elements 54 are desirably disposed such that two pairs of the elements 54 are disposed via the output axis O4.

As the elements 54, an element that is configured by a piezoelectric body such as quartz and outputs electric charges when receiving an external force can be used. The control device 1 can convert the electric charges into the received external force according to an amount of the electric charges. Such a piezoelectric body is capable of adjusting, according to a setting direction of the piezoelectric body, a direction in which the electric charges are generated when the external force is received. In this embodiment, the elements 54 can detect, as shown in FIG. 5, force Fz, which is a component in the vertical direction, and force Fu around the z axis, that is, in the u-axis direction.

In such a force detecting section 5, as explained above, the first plate 51 is fixed to the motor 271 and the second plate 52 is fixed to the base section 230A. With such a configuration, when the motor 271 of the u-driving unit 27 is driven and a not-shown rotor on the inside of the motor 271 rotates, reaction of the rotation is transmitted to the force detecting section 5 via the housing of the motor 271. The force detecting section 5 detects the transmitted reaction, converts information concerning the reaction into an electric signal, and transmits the electric signal to the robot control section 11 of the control device 1 shown in FIG. 2, whereby control explained below is performed. Accordingly, the third arm 24 can be driven based on a result of the detection by the force detecting section 5.

In particular, in the past, a force detecting section is set at the distal end of an arm equivalent to the third arm 24. However, with such a configuration, the length of a substantial movable portion of the arm, that is, the length from the base of the arm to an end effector is large. On the other hand, in the present disclosure, the force detecting section 5 is set between the second arm 23 and the motor 271 to detect reaction generated by driving the motor 271. In other words, the force detecting section 5 is incorporated in the second arm 23 and the force detecting section 5 is omitted from being set in the third arm 24. Consequently, the substantial movable portion of the third arm 24 can be reduced in length. Accordingly, for example, the distal end of the end effector 7 is located further on the −z-axis side than in the past when the third arm 24 is moved to the −z-axis side to the maximum. A reduction in the size the third arm 24 can be realized. Further, weight capacity of the third arm 24 can be secured more sufficiently compared with the past.

The force output section 5 is set between the second axis O2 and the third axis O3. In other words, the force detecting section 5 deviates from the third axis O3 to the second axis O2 side. Consequently, compared with a configuration in which the force detecting section 5 is provided in the third arm 24, the weight on the distal end side of the second arm 23 can be reduced. Accordingly, an inertial moment in driving the second arm 23 can be reduced, a driving force in driving the second arm 23 can be set relatively small, and a load of the motor 261 that drives the second arm 23 can be reduced.

As shown in FIG. 3, a distance L2 from the second axis O2 to the output axis O4 is desirably smaller than a distance L1 from the third axis O3 to the output axis O4. Consequently, it is possible to more markedly obtain the effect that the load of the motor 261, which drives the second arm 23, can be reduced.

As explained above, the robot 2 includes the base 21, the first arm 22 coupled to the base 21 and configured to turn around the first axis O1, the second arm 23 coupled to the first arm 22 and configured to turn around the second axis O2 parallel to the first axis O1, the third arm 24 coupled to the second arm 23 and configured to turn around the third axis O3 parallel to the first axis O1 and move along the third axis O3, the motor 271 provided in the second arm 23 and configured to drive the third arm 24, and the force detecting section 5 provided between the motor 271 and the second arm 23 and configured to detect reaction generated by driving the motor 271. Consequently, it is possible to adopt a configuration in which the force detecting section 5 is incorporated in the second arm 23 and the force detecting section 5 is omitted from being set in the third arm 24. Accordingly, the substantial movable portion of the third arm 24 can be reduced in length. A reduction in the size of the third arm 24 can be realized.

As explained above, the robot system 100 includes the robot 2 and the control device 1 functioning as the control section that controls the driving of the third arm 24 based on the reaction generated by driving the motor 271 and detected by the force detecting section 5. Consequently, it is possible to control the operation of the third arm 24 according to an applied external force while enjoying the advantages of the robot 2 explained above. For example, it is possible to perform control respectively during first acceleration, during steady operation, during deceleration when the motor 271 is rotated. It is possible to covert a change amount of the reaction generated by driving the motor 271 and detected by the force detecting section 5 into an external force (in particular, an external force in the z-axis direction) applied to the third arm 24 and move the third arm 24 in the u-axis direction and the z-axis direction according to the external force and use the external force for force control for the end effector 7.

The horizontal articulated robot and the robot system according to the present disclosure are explained above based on the embodiment shown in the figures. However, the present disclosure is not limited to this. The components of the sections can be replaced with any components having the same functions. Any other components may be added.

In the embodiment, the number of rotation axes of the robot arm is three. However, in the present disclosure, the number of rotation axes of the robot arm is not limited to this. The number of rotation axes of the robot arm may be, for example, two or four or more. In the embodiment, the number of arms is three. However, in the present disclosure, the number of arms is not limited to this. The number of arms may be, for example, two or four or more.

In the embodiment, the motor 271 and the force detecting section 5 are fixed. However, the present disclosure is not limited to this. For example, a speed reducer or the like may be interposed between the motor 271 and the force detecting section 5.

In the embodiment, the force detecting section 5 is provided between the motor 271 and the base section 230A. However, the present disclosure is not limited to this. For example, the force detecting section 5 may be provided between the motor 281 and the base section 230A. Even in this case, the effects of the present disclosure can be obtained. The force detecting section 5 may be provided between the motor 271 and the base section 230A and between the motor 281 and the base section 230A.

What is claimed is:

1. A horizontal articulated robot comprising:
   a base;
   a first arm coupled to the base and configured to turn around a first axis;
   a second arm coupled to the first arm and configured to turn around a second axis parallel to the first axis;
   a third arm coupled to the second arm and configured to turn around a third axis parallel to the first axis and move along the third axis;
   a motor provided in the second arm and configured to drive the third arm; and
   a force detecting section provided between the motor and the second arm, the force detecting section being configured to detect an external force applied to the third arm by detecting a reaction that is transmitted to the force detecting section via the motor, the reaction being generated by driving the motor.

2. The horizontal articulated robot according to claim 1, wherein
   the force detecting section includes a first plate, a second plate, and a plurality of elements held between the first plate and the second plate,
   the first plate is fixed to the motor, and
   the second plate is fixed to the second arm.

3. The horizontal articulated robot according to claim 2, wherein, when viewed from an axial direction of the third axis, an output axis of the motor is present between the plurality of elements.

4. The horizontal articulated robot according to claim 1, wherein the force detecting section is set between the second axis and the third axis.

5. A robot system comprising:
   the horizontal articulated robot according to claim 1; and
   a control section configured to control the driving of the third arm based on the reaction detected by the force detecting section.

* * * * *